United States Patent [19]

Tsai et al.

[11] Patent Number: 5,287,285
[45] Date of Patent: Feb. 15, 1994

[54] ELECTRONIC MULTI-SHAFT ABSOLUTE POSITION DETECTING DEVICE

[75] Inventors: You-Kung Tsai; Yuh-Jinn Wang; Yaw-Shen Lie; Yie-Wen Chen, all of Hsinchu, Taiwan

[73] Assignee: Industrial Technology Research Institute, Taiwan

[21] Appl. No.: 705,649

[22] Filed: May 24, 1991

[51] Int. Cl.$^5$ .............................................. G06F 15/46
[52] U.S. Cl. .............................. 364/474.37; 364/184; 364/187; 318/603
[58] Field of Search ............ 364/184, 187, 474.37, 364/474.28; 318/603; 341/11; 365/229

[56] References Cited

U.S. PATENT DOCUMENTS

| | | | |
|---|---|---|---|
| 3,691,357 | 9/1972 | McIntosh | 364/184 |
| 4,424,569 | 1/1984 | Imazeki et al. | 364/474.28 |
| 4,573,139 | 2/1986 | Bonivich | 364/167.01 |
| 4,587,622 | 5/1986 | Herzog | 364/474.37 |
| 4,724,525 | 2/1988 | Purcell et al. | 364/474.37 |
| 4,796,005 | 1/1989 | Ishida et al. | 318/603 |
| 4,901,256 | 2/1990 | McMurtry et al. | 364/474.37 |
| 5,136,224 | 8/1992 | Matsuura et al. | 364/474.28 |

Primary Examiner—Jerry Smith
Assistant Examiner—Paul Gordon
Attorney, Agent, or Firm—Cushman, Darby & Cushman

[57] ABSTRACT

An electronic multi-shaft absolute position detecting device comprising an absolute position recording circuit, an interface circuit, a spare power circuit, and a cooperating application software circuit is used to detect the increment position signal produced by the measuring system of the numerical control machine tone and convert the signal into absolute position signal and record the machine position value. In case power is cut off, the spare power circuit can provide the absolute position recording circuit and interface circuit with power so that the absolute position recording circuit can continuously detect the position signals produced by the measuring system and record the machine position value thereof. After the power supply is restored, the absolute position recording circuit can respond to the requirement of a numerical control system to read the final position value of the machine when the power is restored and transmit the final position value to the numerical control system through the interface circuit, making the machine tool automatically continue the original processing operation.

4 Claims, 11 Drawing Sheets

ELECTRONIC MULTI-SHAFT ABSOLUTE POSITION DETECTING DEVICE

BACKGROUND OF THE INVENTION

1. Field of the Invention

The present invention relates to a detecting device capable of detecting the absolute position of a numerical control machine tool, and more particularly to an electronic multi-shaft absolute position detecting device.

2. Description of the Related Art

The prior manually operated machine tool had been replaced by the current computerized numerical control machine tool, which has the following advantages: easy change of processing manner, reducing requirement for labor, reducing processing time and possible error, high reliability, good efficiency, etc.

However, in the computerized numerical control machine tool, because the signals produced by the encoder or linear scale are increment position signals, only the relative position of the machine is provided. As a consequence, when initiating the machine or when the power is restored after power is cut off, the absolute position of the machine can be obtained only by means of returning to home position. However, in consideration of the safety of the operator and machine, most machine tools are unable to automatically execute the operation of returning to home position. This operation must be done by the operator. This shortcoming limits the application of the computerized numerical machine tool in unmanned automatic processing system.

Although the Gray Code Encoder, which is capable of detecting the absolute position signal, can be disposed on the rotary shaft for detecting the absolute position signal so that the computerized numerical control machine tool can automatically recover when the power is restored to continuously execute the processing operation, the Grey Code Encoder has the following disadvantages:

1. The Gray Code Encoder is a binary encoder and thus it can only provide binary analysis (such as 256,1024,4096, etc.), which is different from the decimal system used in computerized numerical control machine tool. This often causes troubles in processing.

2. According to the design principle of the Gray Code Encoder, to increase an analysis level by one bit, a circle of photo-screen and a set of photodiodes need be added thus increasing difficulty in manufacturing. Therefore, high analysis level (such as over 10,000/ev) is rarely achieved to satisfy the high accuracy requirement of the computerized numerical control machine tool.

3. The Gray code Encode can only provide the absolute angle of single rotation. As to the computerized numerical control machine tool with more than one rotation, additional gears, etc. must be installed so as to provide the detection of the absolute position signals of the entire distance of travel. The cost is therefore increased.

4. The tooth clearance, back clearance and screw rod manufacturing error causes location error. Thus, in a sophisticated machine tool, a linear scale is used to overcome the location error. Therefore, the Gray Code Encoder can not be used.

As evident from the above, the Gray Code Encoder obviously is not an ideal means for detecting the absolute position signals.

SUMMARY OF THE INVENTION

The applicant has developed the present device to eliminate the above shortcomings. The present invention can be optionally installed between the numerical control system and measuring system of a computerized numerical control machine tool without changing the hardware structure thereof. Cooperating with an application software program, in case power is cut off, the present invention can detect the increment type of position signals produced by the general encoders or linear scale of the measuring system and convert the signals into absolute position signals and record the machine position value. After the power is restored, the original processing state is continuously executed. The present invention is capable of replacing the Gray code Encoder and eliminating the shortcomings thereof so that the computerized numerical control machine tool can be applied to an unmanned automatic processing system.

The present invention has the following advantages:

1. The present invention is designed as a module so that it can be optionally added to the computerized numerical control machine tool without changing the hardware structure thereof. Therefore, the installation of the present invention is easy and the cost is low.

2. The present invention employs the absolute position signal pattern to perform the transmission so that the position error in conventional increment position signal produced by signal reduction due to long distance transmission and noise interference due to poor electrical environment can be deleted to ensure the quality of signal transmission.

3. The increment position signals produced by general encoder or linear scale are converted into the absolute position signals and then the signals are sent to the numerical control system to avoid the error of the position signal produced by the inductance and capacitance of the transmission wire caused by high frequency pulse series produced by the encoder working at high speed.

4. The present invention can simultaneously detect the absolute position signals of up to twelve shafts.

5. The present invention can cooperate with general high analysis encoder for performing high analysis detection.

The invention as well as its many advantages may be further understood by reference to the following detailed description and drawings.

DETAILED DESCRIPTION OF THE PREFERRED EMBODIMENT

Figure 1:
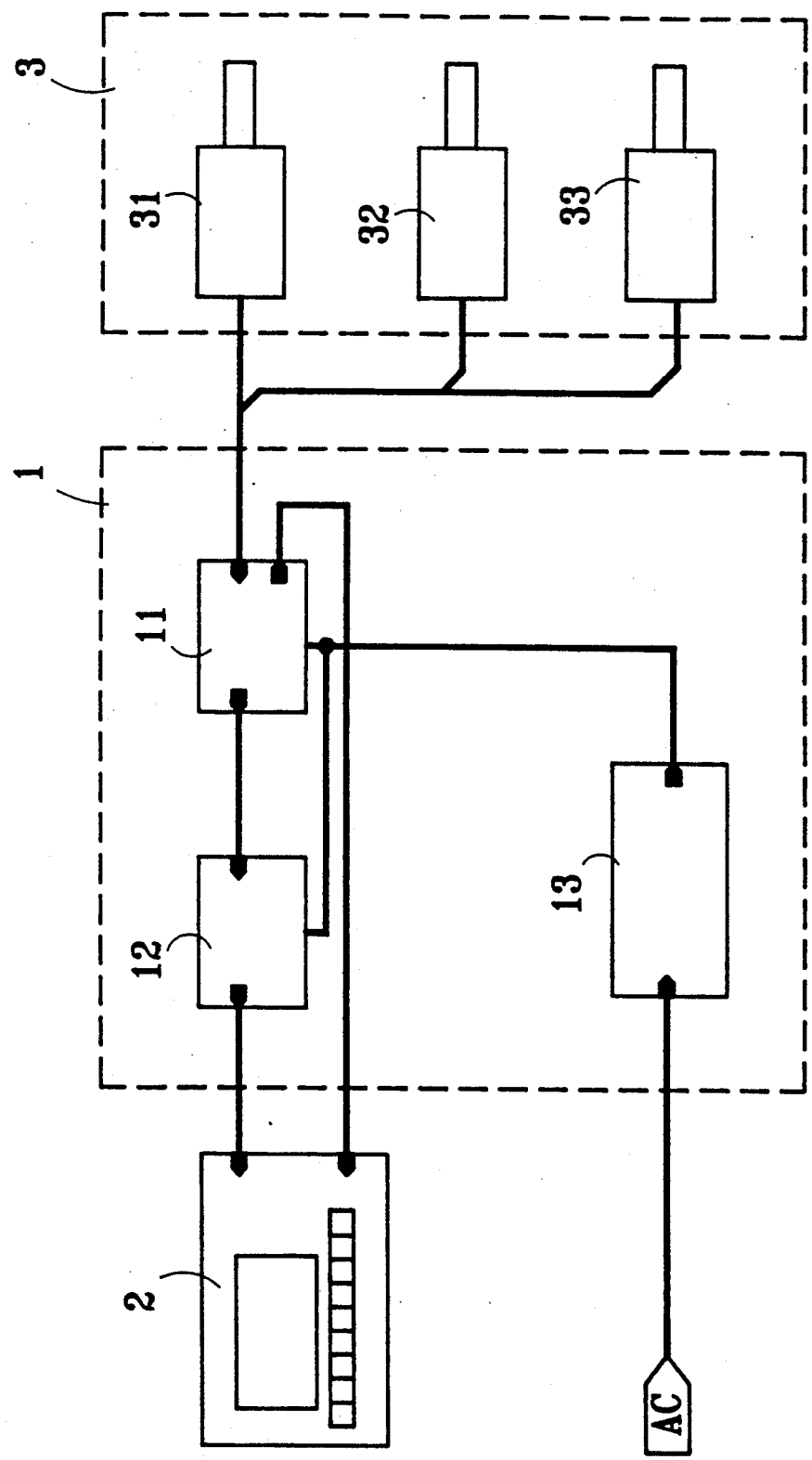
FIG. 1 is a block diagram of the electronic multi-shaft absolute position detecting device of this invention.

FIG. 1, shows a block diagram of the present electronic multi-shaft absolute position detecting device 1, which comprises an absolute position recording circuit 11, an interface circuit 12 and a spare power circuit 13. The input terminals of the circuit 11 are connected to the encoders or optical rulers 31, 32, 33 disposed on each rotary shaft of a measuring system 3 of a numerical control machine tool for detecting the increment type of position signals produced by the encoders or optical rulers 31, 32 and 33, and converting the same into absolute position signals and recording the machine position value thereof. The number of the rotary shafts of the measuring system 3 can be increased up to twelve as necessary. The input terminal of the interface circuit 12 is connected to the output terminal of the circuit 11, while the output terminal of the interface circuit 12 is connected to a numerical control system 2 of the numerical control machine tool via a standard interface. The signal transmission between circuits is performed by a parallel port or serial port bus for meeting the requirement of high speed transmission. The output terminal of the spare power circuit 13 is connected to both the absolute position recording circuit 11 and interface circuit 12, whereby in case power is cut, it can provide the circuits 11, 12 with necessary power, permitting the absolute position recording circuit 11 to continuously detect the position signals produced by the measuring system 3 and record the machine position value. After the power supply becomes normal, the absolute position recording circuit 11 can respond to the requirement of the numerical control system 2 to read the final machine position value when the power supply is restored. The final machine position value is transmitted via the interface circuit 12 to the numerical control system 2, making the same restore to continuously perform original processing operation.

Figure 2:
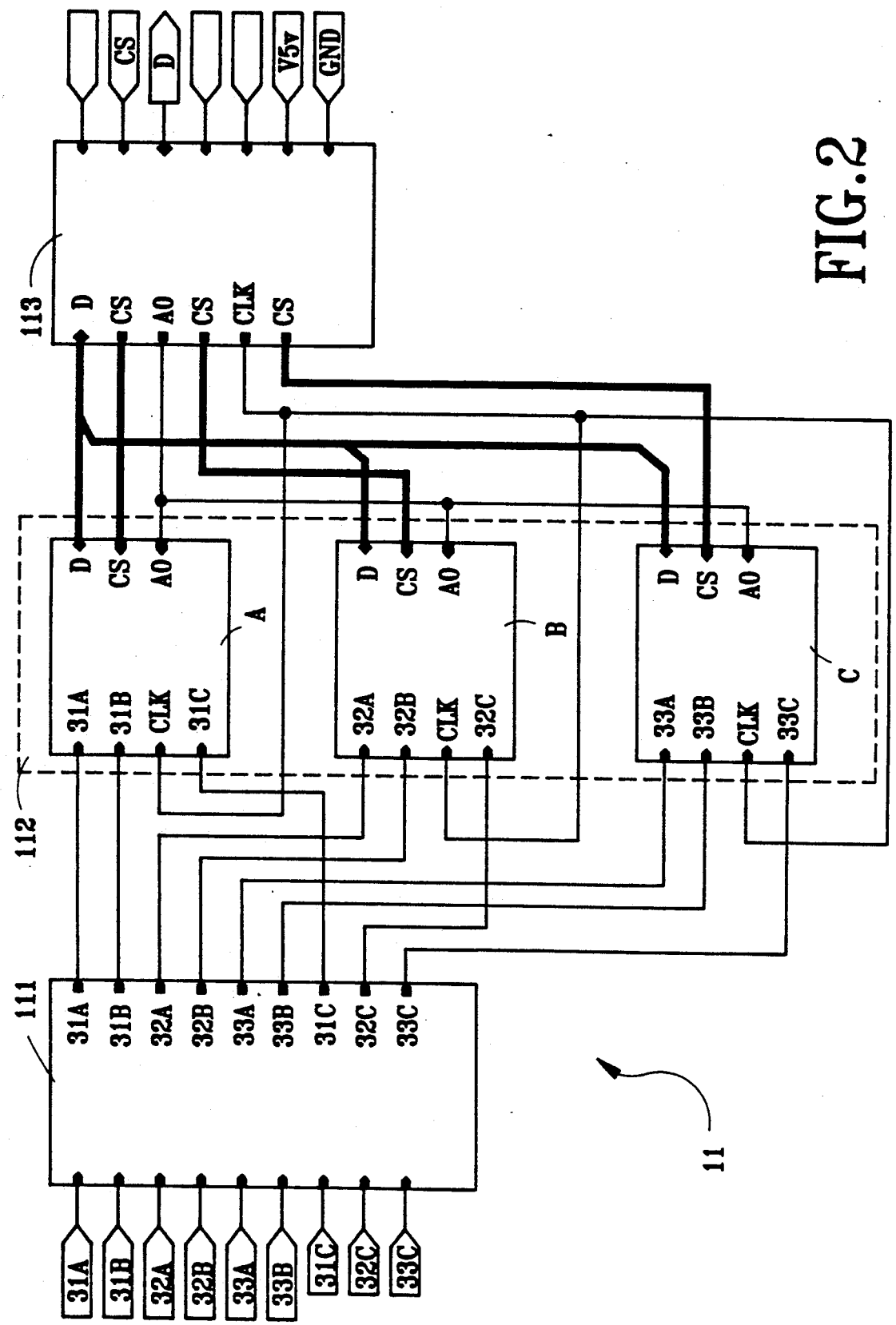
FIG. 2 is a block diagram of the absolute position recording circuit thereof.

FIG. 2 shows a block structure diagram of the absolute position recording circuit of the present invention, wherein the recording circuit 11 is composed of a differential amplifier 111, a recorder 112 and a recording interface 113. The differential amplifier 111 is connected to all the encoders 31, 32, 33 disposed on the rotary shafts of the measuring system 3 for obtaining the increasing type of position signals A, B produced by the encoders. In FIG. 2, the 31A, 31B denote the signals A, B of encoder 31, 32A, 32B denote the signals A, B of encoder 32, 33A, 33B denote the signals A, B of encoder 33, 31C denotes the index value of encoder 31, 32C denotes the index value of encoder 32, 33C denotes the index value of encoder 33. These signals are amplified by the differential amplifier 111 and output to the recorder 112 which is composed of three recorders A, B, and C. Each recorder processes the increasing type of position signals produced by one encoder and converts the signals into absolute position signals D and sends the same to the recording interface 113 which then outputs the signals to the interface circuit 12. The recording interface 113 can produce time base clock pulse and provide the same for the recorder 112.

Figure 3:
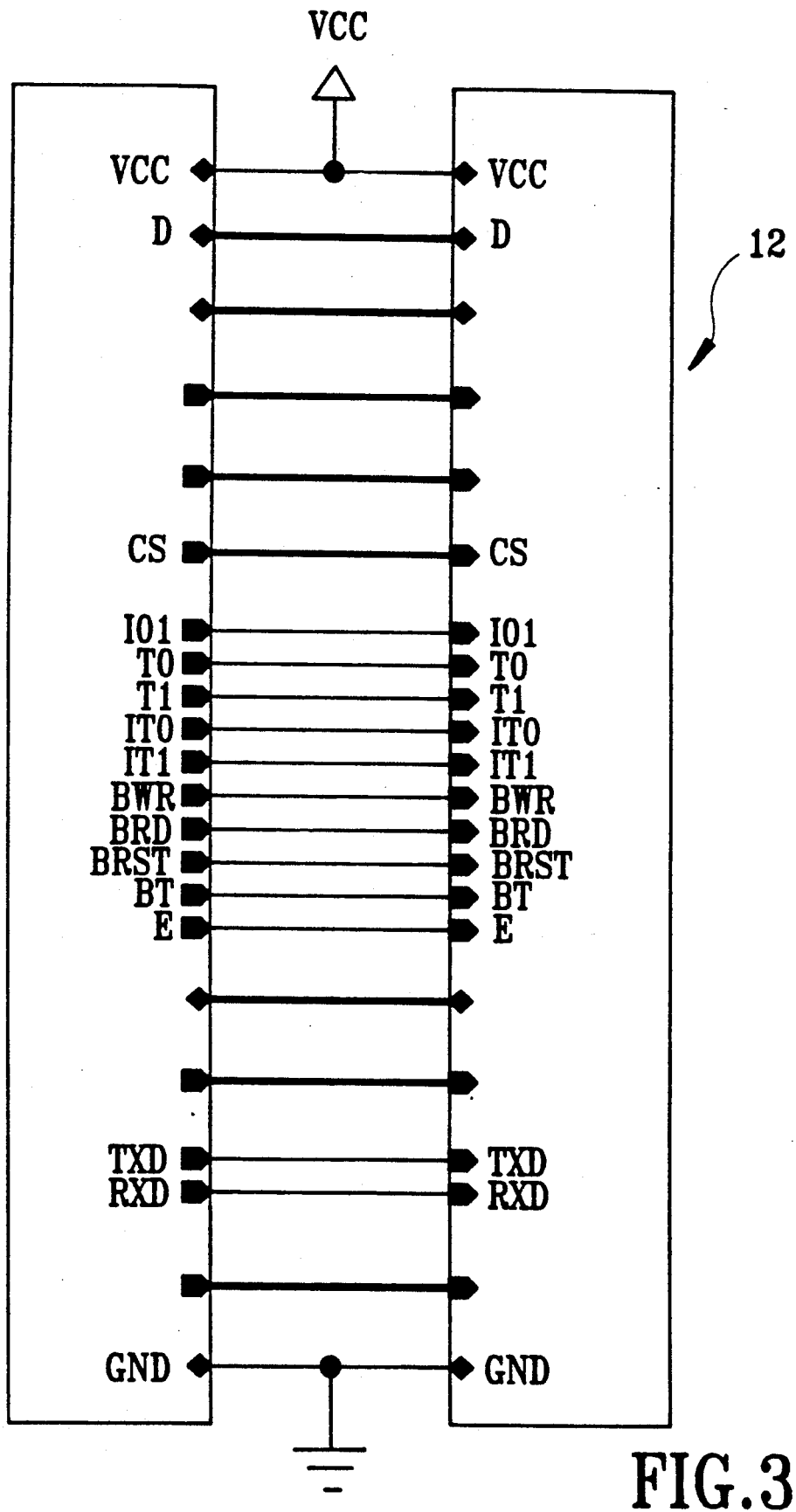
FIG. 3 is a block diagram of the interface circuit thereof.

FIG. 3 shows the block diagram of the interface circuit 12 of this invention. The input terminal of the interface circuit 12 is connected to the output terminal of the absolute position recording circuit 11 by parallel bus. The output terminal of the interface circuit 12 is connected to the numerical control system 2 by standard interface, capable of executing the clear command sent from the numerical control system 2 and sending the absolute position signals to the numerical control system 2.

Figure 4:
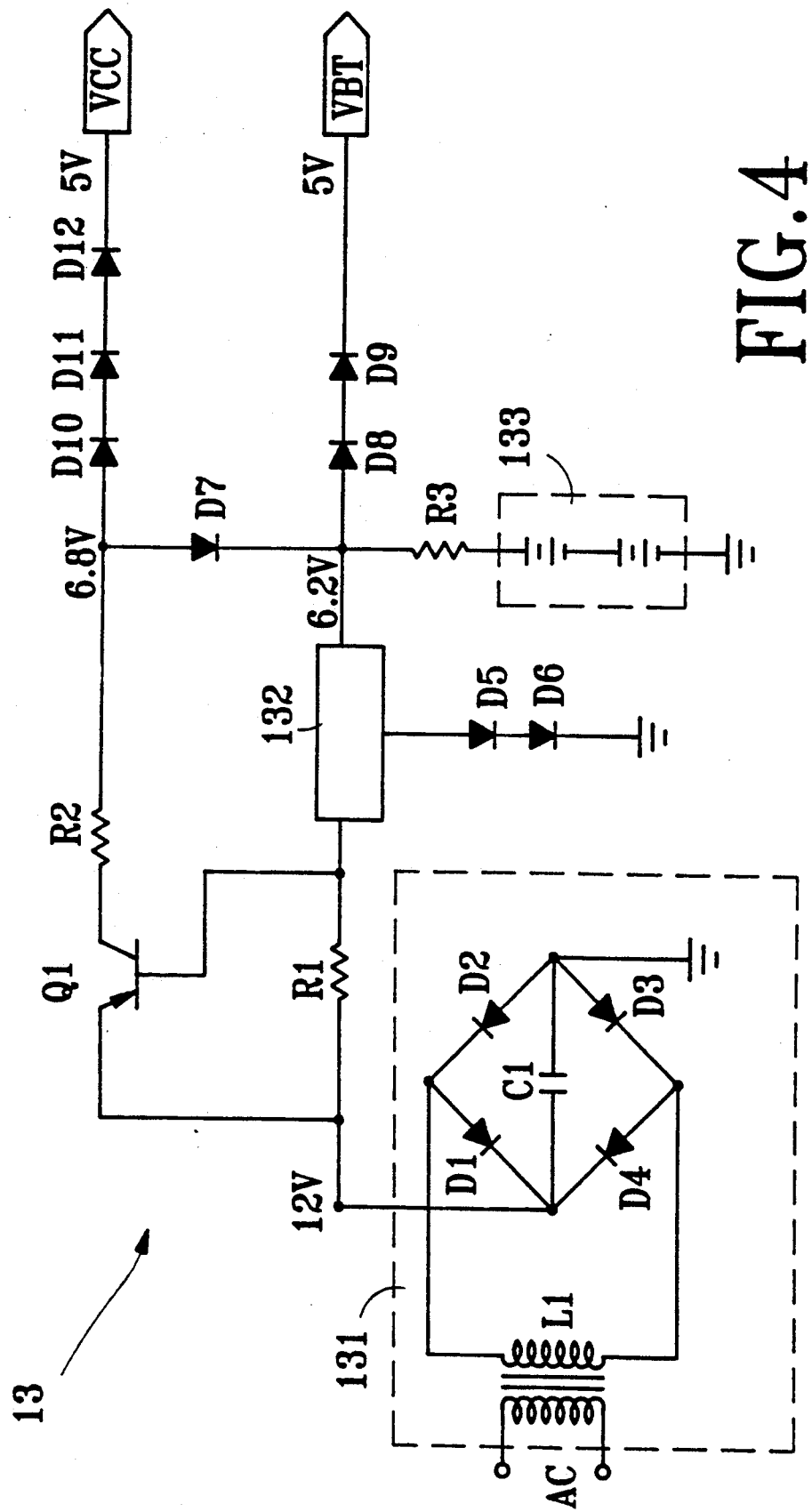
FIG. 4 is a circuit diagram of the spare power circuit thereof.

FIG. 4 shows a circuit diagram of the spare power circuit of this invention, wherein the spare power circuit 13 comprises a power converter 131, a voltage-stabilizer 132, a rechargeable battery 133 and other cooperating electronic elements. After the power converter 131 converts alternate current into 12 v direct current, the power is divided into two voltages. One of the voltages goes through transistor Q1 and resistors R1, R2 and is decreased to 6.8 V, and thereafter, by 0.6 V forward bias voltages of diodes D10, D11, D12, is lowered to VCC 5 V for providing the whole circuit with power. The other voltage goes through the voltage stabilizer 132 to be stabilized into 6.2 V to charge the rechargeable battery 133. Also, the voltage is lowered to VBT 5 V by the diodes D8, D9 for providing the whole circuit with power. In case power is cutoff, the rechargeable battery 133 supplies the whole circuit with power.

Figure 5:
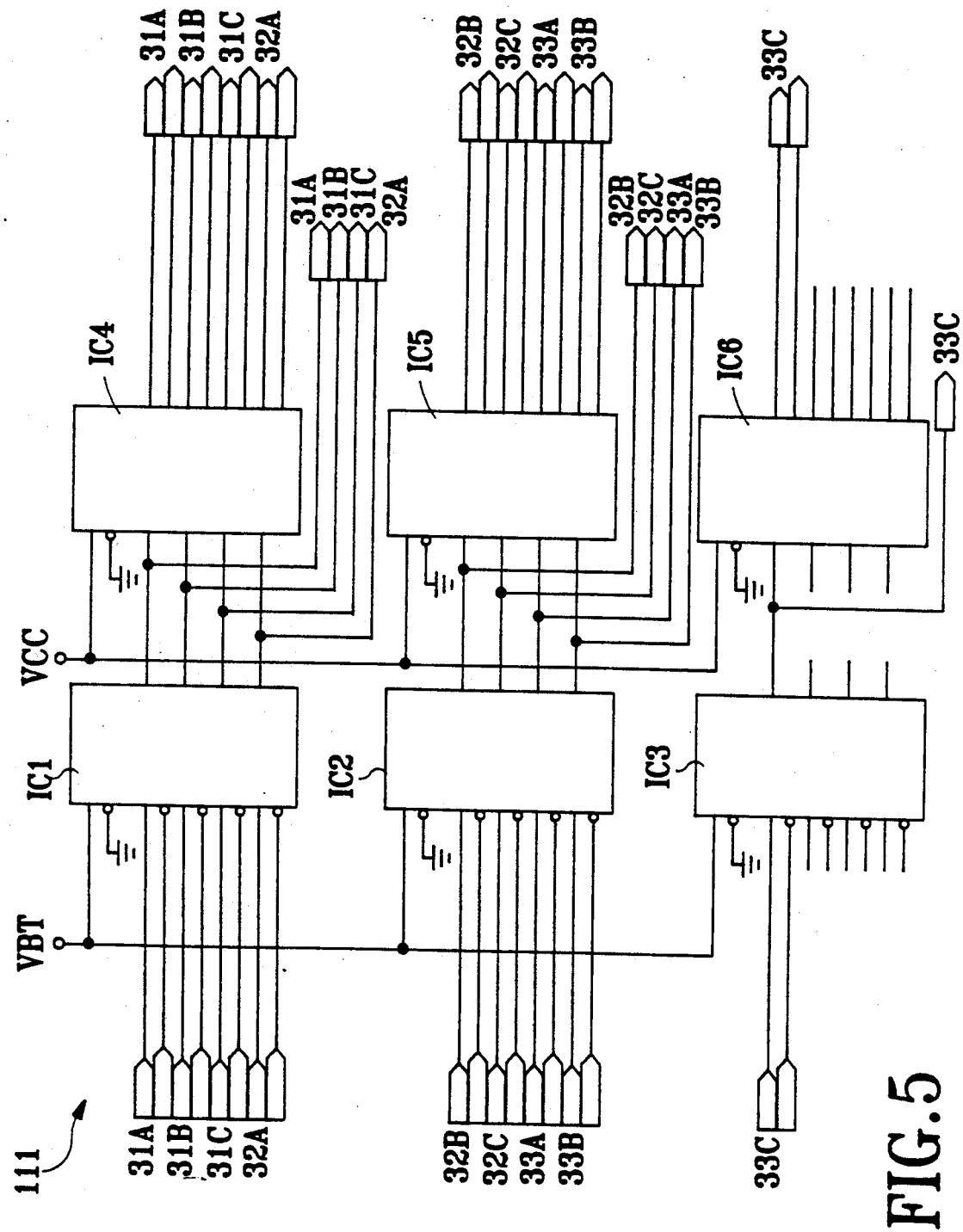
FIG. 5 is a circuit diagram of the differential amplifier of the absolute position recording circuit thereof.
Figure 6:
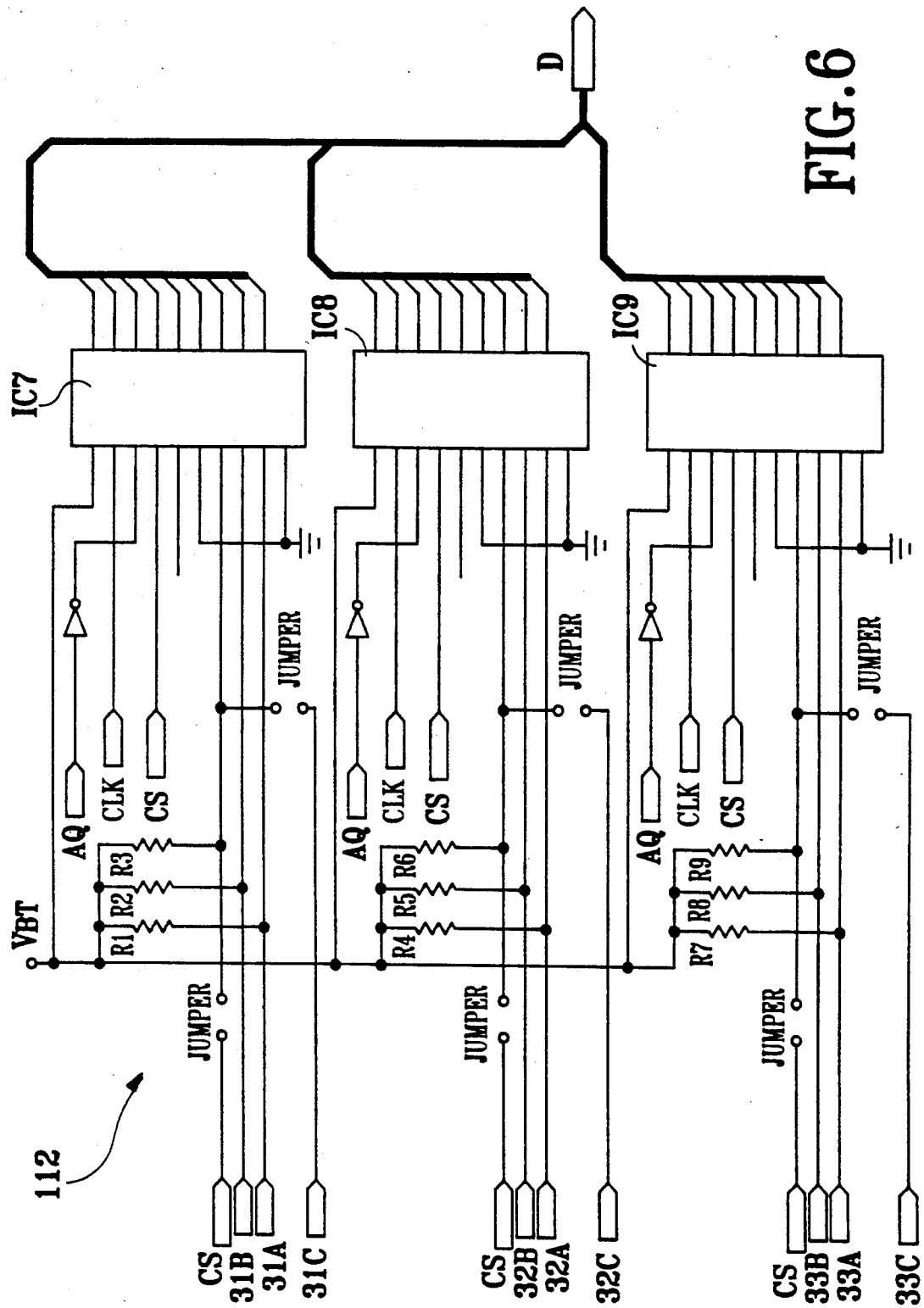
FIG. 6 is a circuit diagram of the recorder of the absolute position recording circuit thereof.
Figure 7:
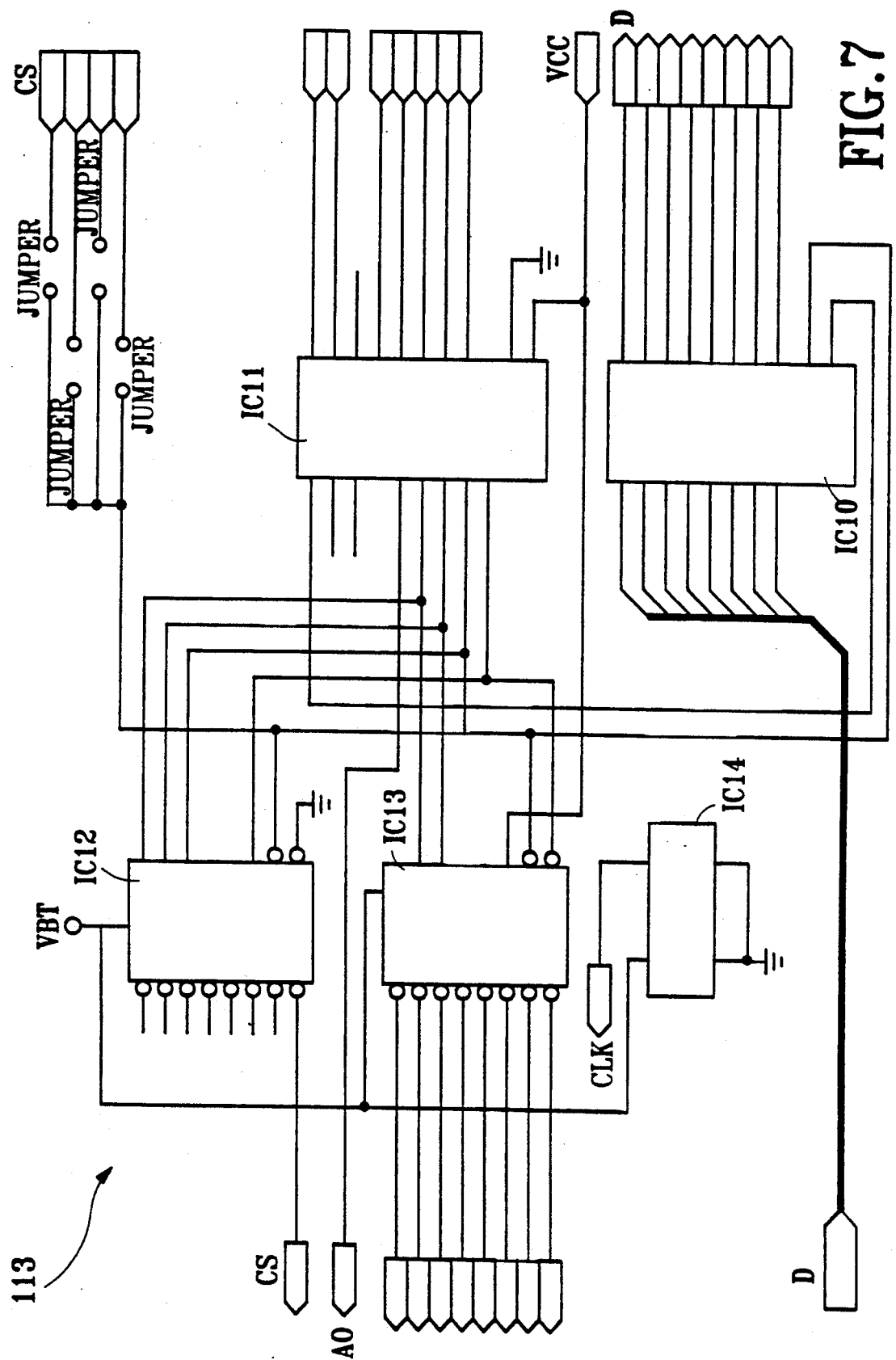
FIG. 7 is a circuit diagram of the recording interface thereof.

Please refer to FIG. 5, which shows the circuit diagram of the differential amplifier of the absolute position recording circuit 11, wherein the differential amplifier 111 comprises differential receivers IC1, IC2, IC3 and differential drivers IC4, IC5, and IC6. The differential receivers IC1, IC2, IC3 receive the A, B increment type of position signals from the encoders 31, 32, 33 and the index values 31C, 32C, 33C and transmit the same to the differential drivers IC4, IC5 and IC6 to be driven and amplified and output to the recorder 112. As shown in FIG. 6, the recorder 112 comprises IC7, IC8 and IC9. Each recorder processes the A, B increment type of position signal of one encoder, and converts the same into absolute position signals D and sends the same to the recording interface 113. As shown in FIG. 7, the recording interface 113 comprises integrated circuits IC10, IC11, IC12, IC13 and IC14. The absolute position signal D is output to the recording interface 113 and then received by the integrated circuit IC10 and then output to the interface circuit 12. The integrated circuit IC11, IC12 and IC13 are additionally designed for enlargement. The integrated circuit IC14 is a monooscillation circuit capable of producing 12 MHZ time base clock pulse and providing the same for the recorder 112.

Figure 8:
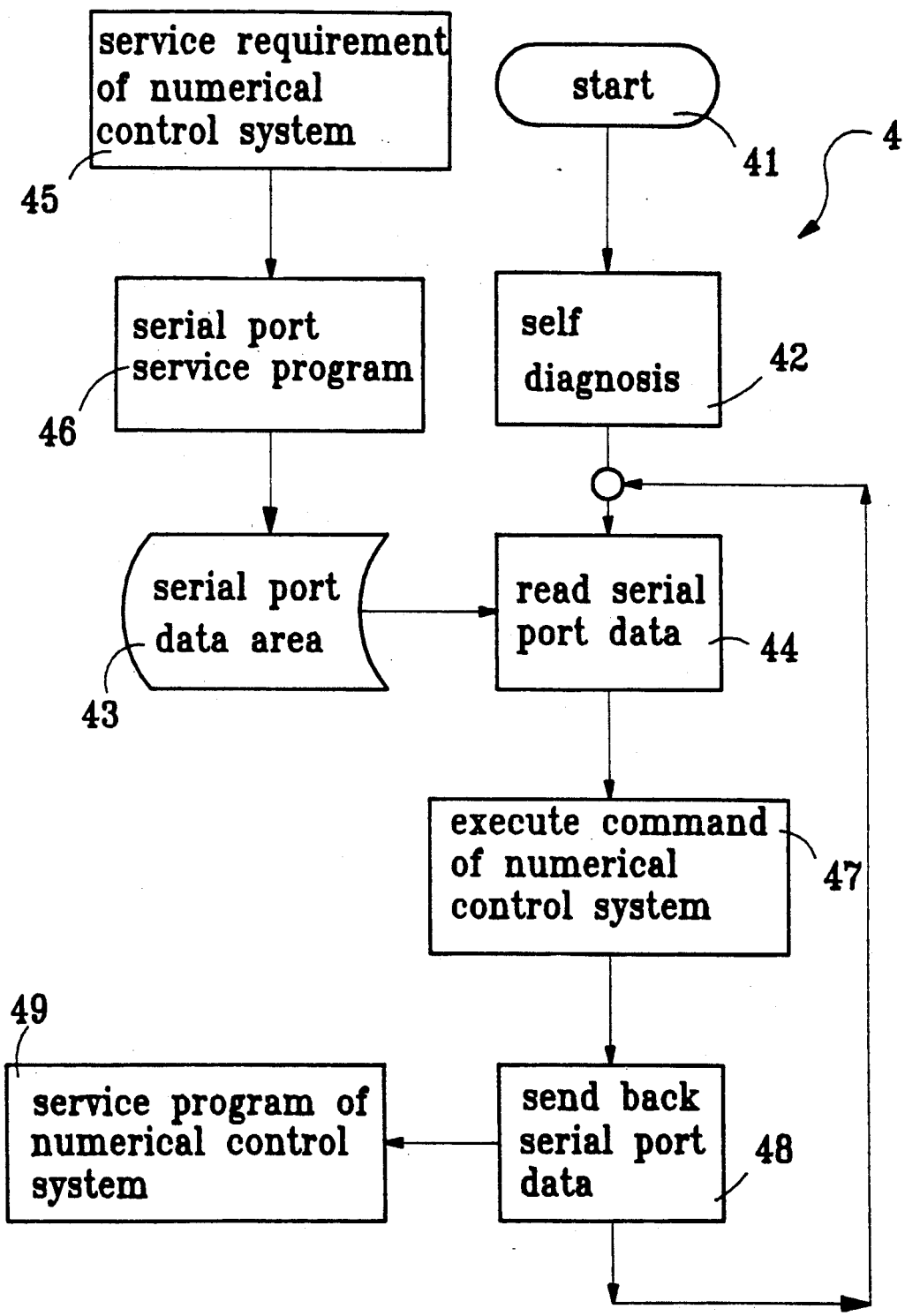
FIG. 8 shows the application software system thereof.

FIG. 8 shows the application software system of this invention. The software system 4 cooperates with the hardware of this invention to enable the digital controlling machine tool to execute the present action. As shown in the flow chart, the after activation 41 of the machine, self diagnosis in step 42 will be performed to check if any failure takes place. Then, serial port data is read during step 44 at serial port data area 43. The service requirement 45 of the numerical control system 2 of the numerical control machine tool is communicated with the module 1 through serial port service program 46. After reading serial port data at step 44, the command of the numerical control system 2 is executed at step 47, and then the serial port data are sent back 48 and at the same time, the service program of the numerical control system 49 is performed. The application software system 4 provides the service program required during the signal transmission between the numerical control system 2 and the present device 1.

Figure 9:
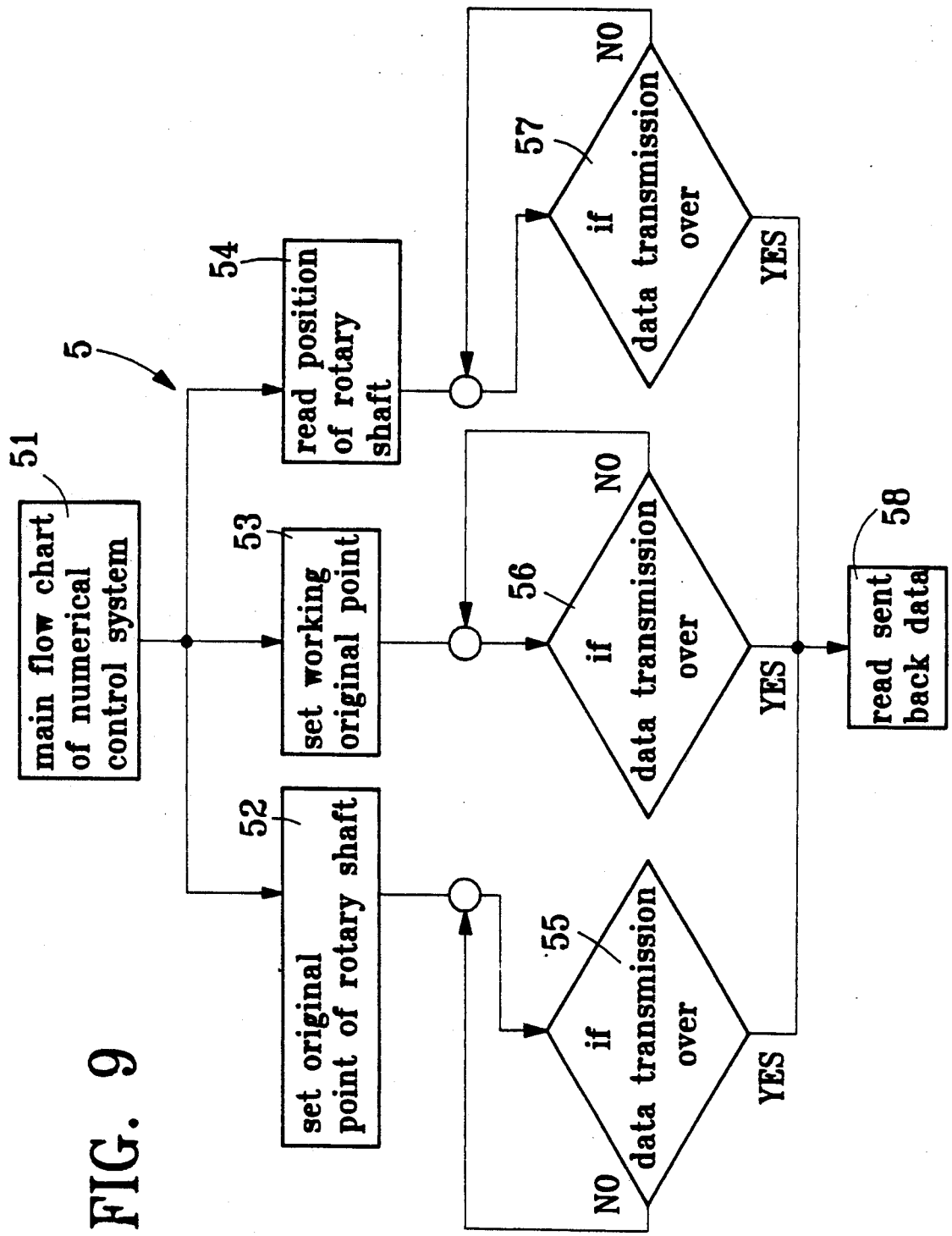
FIG. 9 is a flow chart of the application program thereof.

FIG. 9 shows the application program flow chart of the present invention, wherein the application program 5 is the main flow procedure 51 of the numerical control system 2. First, the original point of the rotary shaft is set in step 52, the working original point is set in 53 and the position of the rotary shaft is read in step 54. Then, it is determined if the data transmission is over in steps 55, 56, 57. If not, then the data transmission continues. If so, then the sent back data is read in step 58.

Figure 10:
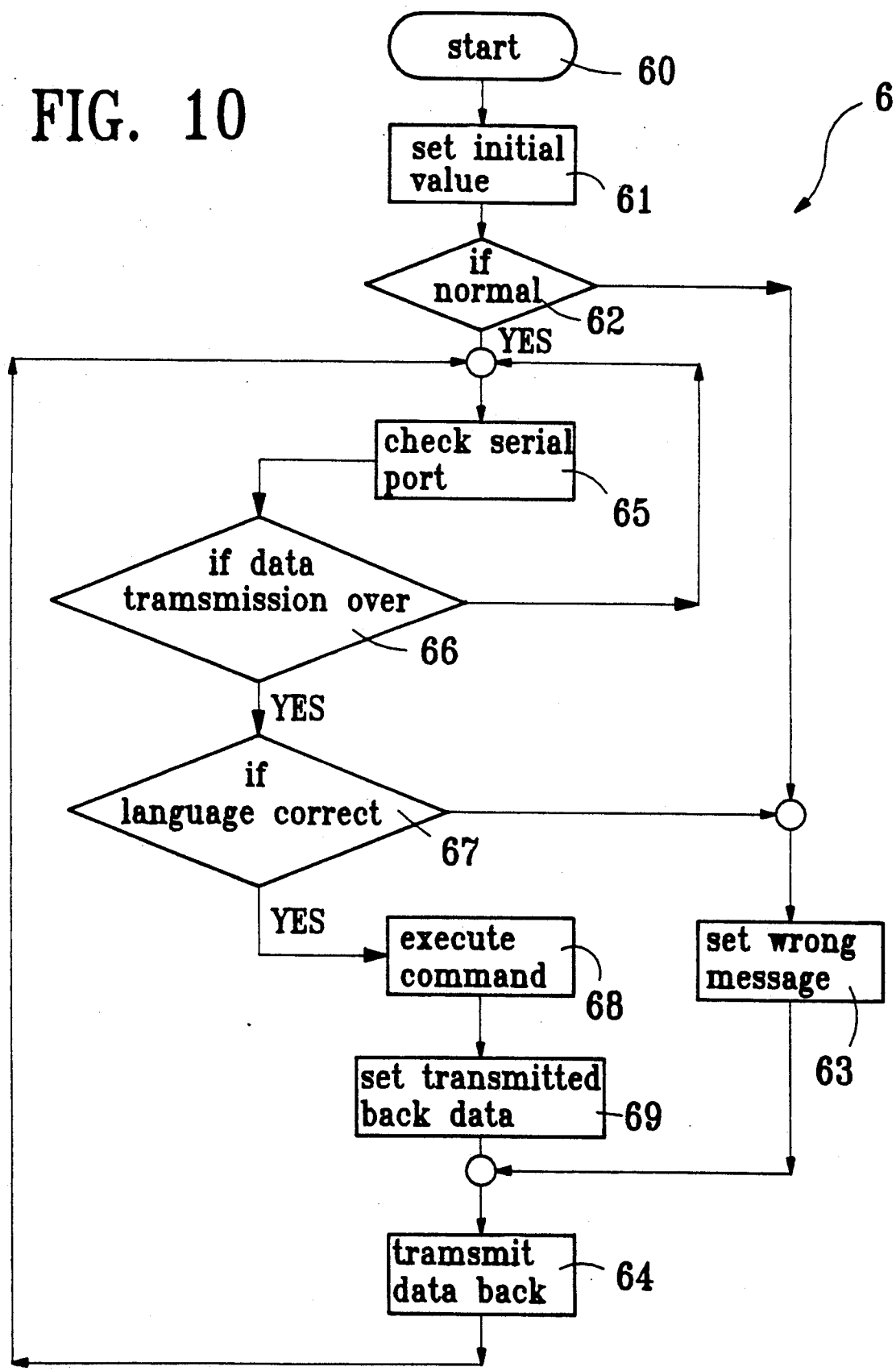
FIG. 10 is a flow chart of the main program thereof.

FIG. 10 shows the main program flow chart of this invention, wherein the main program 6 includes starting at step 60, setting the initial value in step 61, and self-diagnosis in step 62. If the system is not normal, then a wrong message is set in step 63 and then the transmitting back data 64 step is performed to send back the corrected data. If the system is normal, then the serial port data is checked in step 65 and then it is determined if the data transmission is over in step 66. If not, then the data transmission is continued. If data transmission is over it is determined if the command is correct in step 67. If not, the wrong message is set in step 63. If the command is correct so, then the command is executed in step 68 and the transmitted back data is set in step 69. Then the data is transmitted back in step 64.

Figure 11:
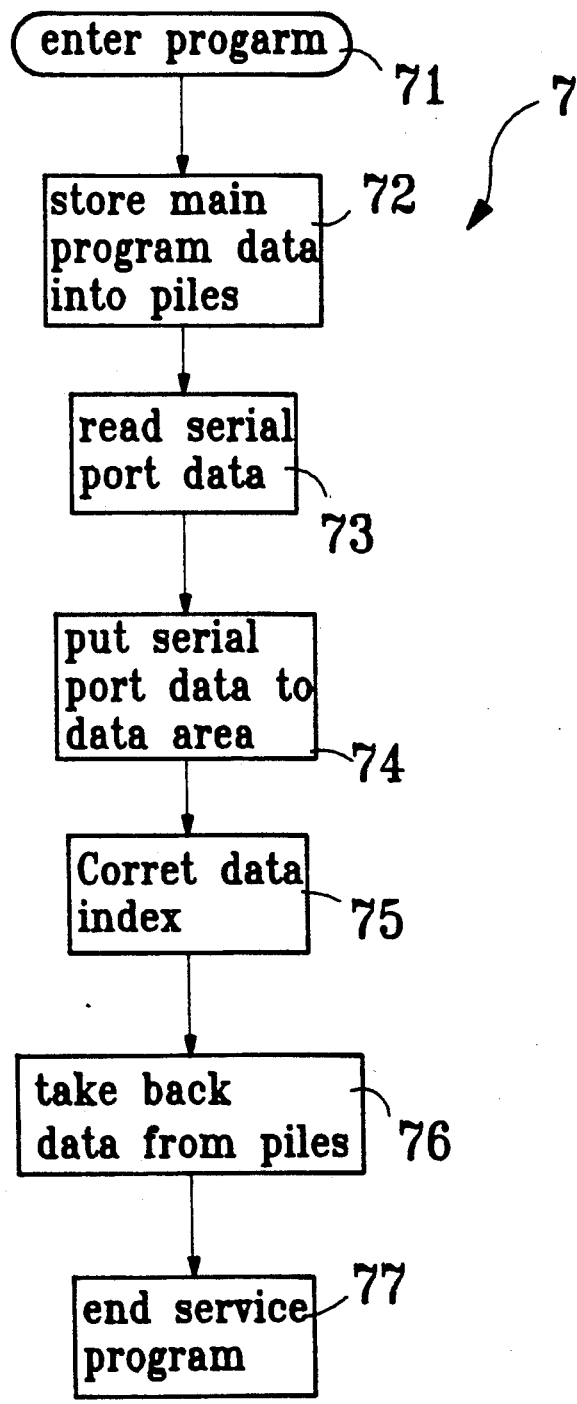
FIG. 11 is a flow chart of the serial port interrupting service program thereof.

FIG. 11 shows the flow chart of the serial port interrupting service program, wherein the flow procedure of the serial port interrupting service program 7 includes entering the program in step 71, storing the main program data into piles in step 72, reading the serial port data in step 73, putting the read serial port data to the data area in step 74, correcting the data index in step 75, taking back the data from the pile in step 76 and finally ending the service program at step 77.

According to the above arrangement, the present invention can be optionally installed between the numerical control system and measuring system of a computerized numerical control machine tool without changing the hardware structure thereof. Cooperating with an application software program, in case power is cutoff, the present invention can detect the increment type of position signals produced by the general encoders or linear scale of the measuring system and convert the signals into absolute position signals and record the machine position value. After the power is restored, the original processing state is continuously executed. The present invention is capable of replacing the Gray Code Encoder and eliminating the shortcomings thereof.

As indicated, the structure herein may have various embodiments. Recognizing various modifications will be apparent, the scope hereof shall be deemed to be defined by the claims as set forth below.

What is claimed is:

1. An electronic multi-shaft absolute position detecting device for coupling a measuring system not having absolute position detecting capability and a numerical control system of a numerical control machine tool to act as a transmission medium therebetween, said device comprising:

an absolute position recording circuit for coupling to a plurality of measuring devices of said measuring system to receive increment position signals produced thereby and to convert said increment position signals into absolute position signals representative of a position value of said machine tool; and an interface circuit, coupled to said absolute position recording circuit, for coupling to said numerical control system to execute a clear command when said clear command is provided by said numerical control system and to provide said absolute position signals to said numerical control system to enable said numerical control machine tool to operate in accordance with said absolute position signals.

2. A device as claimed in claim 1, wherein said absolute position recording circuit comprises a differential amplifier, recorder, and recording interface;

said measuring devices comprising at least one of said encoders and linear scales disposed on each rotary shaft of said measuring system to provide said increment position signals;

said differential amplifier amplifying said increment position signals to produce amplified increment position signals and outputting said amplified increment position signals to said recorder;

said recorder converting said amplified increment position signals into absolute position signals and providing said absolute position signals to said recording interface;

said recording interface outputting said absolute position signals to said interface circuit.

3. A device as claimed in claim 1, further comprising controlling means for enabling said numerical control system to control said absolute position recording circuit and said interface circuit.

4. An device as claimed in claim 1, further comprising:

a spare power circuit, coupled to said absolute position recording circuit and said interface circuit, for providing backup power to said absolute position recording circuit and said interface circuit when driving power being supplied to said absolute position recording circuit and said interface circuit is terminated to enable said absolute position recording circuit to receive said increment position signals produced by said measuring system and convert said increment position signals into said absolute position signals to determine said position value;

said absolute position recording circuit converting, in accordance with a signal provided by said numerical control system, said increment position signals into said absolute position signals to determine said position value when said driving power is restored and transmitting said position value to said numerical control system through said interface circuit to cause said machine tool to continue operating.

* * * * *